United States Patent
Birk et al.

(10) Patent No.: US 11,261,924 B2
(45) Date of Patent: Mar. 1, 2022

(54) METHOD FOR OPERATING A CLUTCH OF A DRIVETRAIN FOR A MOTOR VEHICLE AND MOTOR VEHICLE HAVING A DRIVETRAIN

(71) Applicant: AUDI AG, Ingolstadt (DE)

(72) Inventors: Andreas Birk, Nuremberg (DE); Dominik Gottlieb, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 273 days.

(21) Appl. No.: 16/607,889

(22) PCT Filed: Mar. 14, 2018

(86) PCT No.: PCT/EP2018/056409
§ 371 (c)(1),
(2) Date: Oct. 24, 2019

(87) PCT Pub. No.: WO2018/197099
PCT Pub. Date: Nov. 1, 2018

(65) Prior Publication Data
US 2021/0332862 A1    Oct. 28, 2021

(30) Foreign Application Priority Data
Apr. 26, 2017    (DE) ..................... 10 2017 207 037.4

(51) Int. Cl.
*F16D 48/06*    (2006.01)

(52) U.S. Cl.
CPC .... *F16D 48/064* (2013.01); *F16D 2500/3065* (2013.01); *F16D 2500/3067* (2013.01); *F16D 2500/30806* (2013.01); *F16D 2500/3109* (2013.01); *F16D 2500/3166* (2013.01); *F16D 2500/70406* (2013.01); *F16D 2500/70426* (2013.01)

(58) Field of Classification Search
None
See application file for complete search history.

(56) References Cited

U.S. PATENT DOCUMENTS

| 7,630,811 B2 | 12/2009 | Jiang |
| 2006/0161325 A1 | 7/2006 | Jiang |

FOREIGN PATENT DOCUMENTS

| CN | 101041353 A | 9/2007 |
| CN | 102080722 A | 6/2011 |
| CN | 102966705 A | 3/2013 |

(Continued)

OTHER PUBLICATIONS

DE102012218227 translation (Year: 2012).*

(Continued)

*Primary Examiner* — Timothy Hannon
(74) *Attorney, Agent, or Firm* — Maier & Maier, PLLC

(57) ABSTRACT

A method for operating a clutch of a drivetrain for a motor vehicle, in which at least one micro-slip of the clutch is adjusted in a targeted manner by means of an electronic computing device of the drivetrain, whereby the clutch is operated with the micro-slip during at least one operating phase, wherein an overpressing of the clutch is adjusted in a targeted manner by means of the electronic computing device), whereby the clutch is operated slip-free during at least one second operating phase that is different from the at least one operating phase.

19 Claims, 1 Drawing Sheet

(56) References Cited

FOREIGN PATENT DOCUMENTS

| CN | 103671874 A | 3/2014 |
|---|---|---|
| CN | 104455387 A | 3/2015 |
| DE | 101 60 308 A1 | 7/2002 |
| DE | 10148 424 A1 | 7/2002 |
| DE | 101 50 597 A1 | 4/2003 |
| DE | 102 47 970 A1 | 4/2004 |
| DE | 10 2012 218 227 A1 | 5/2013 |
| DE | 10 2013 200 194 A1 | 7/2013 |
| DE | 10 2013 203 513 A1 | 9/2013 |
| DE | 10 2016 203 624 A1 | 9/2016 |
| DE | 10 2016 115 534 A1 | 3/2017 |
| EP | 2 910 821 A1 | 8/2015 |

OTHER PUBLICATIONS

Chinese Office Action dated May 9, 2020, in connection with corresponding CN Application No. 201880027457.8 (14 pgs., including machine-generated English translation).

Examination Report dated Nov. 21, 2017 in corresponding German application No. 10 2017 207 037 4; 10 pages including Machine-generated English-language translation.

International Search Report and Written Opinion of the International Searching Authority dated Jul. 9, 2018 in corresponding International application No. PCT/EP2018/056409; 31 pages including Machine-generated English-language translation.

English translation of the International Preliminary Report of Patentability dated Nov. 7, 2019, in corresponding International Application No. PCT/EP2018/056409; 10 pages.

* cited by examiner

METHOD FOR OPERATING A CLUTCH OF A DRIVETRAIN FOR A MOTOR VEHICLE AND MOTOR VEHICLE HAVING A DRIVETRAIN

FIELD

The disclosure relates to a method for operating a clutch of a drivetrain for a motor vehicle.

BACKGROUND

Such a method for operating a clutch, for example constructed as a friction clutch, of a drivetrain for a motor vehicle and such a motor vehicle are already known from DE 101 50 597 A1. With the method, at least one micro-slip of the clutch is adjusted in a targeted manner by means of an electronic computing device of the drivetrain, whereby the clutch is operated with the micro-slip during at least one operating phase. Micro-slip is explained in detail in DE 101 50 597 A1. In particular, micro-slip is understood to mean that an input side of the clutch or at least one first component of the clutch disposed on the input side of the clutch rotates at a first speed and an output side of the clutch or at least one second component of the clutch disposed on the output side and drivable by the first component rotates at a second speed, wherein the speeds differ slightly from one another. Thus, micro-slip is a minor slip which, for example, is in a range from and including 10 revolutions per minute to and including 50 revolutions per minute.

The clutch is typically used as a separating clutch to couple an output shaft of a drive engine, which is constructed to drive the motor vehicle, to another shaft and to decouple it from the other shaft so that torques can be transmitted between the output shaft and the other shaft via the clutch. The other shaft is, for example, a transmission input shaft of a transmission of the drivetrain. If micro-slip is adjusted, the output shaft, for example, connected to the input side of the clutch in a rotationally fixed manner rotates at a higher or lower speed than the other shaft connected to the output side of the clutch in a rotationally fixed manner, for example. Operating the clutch with micro-slip can be advantageous to be able to achieve a high level of driving comfort, in particular when shifting a transmission of the drivetrain.

Furthermore, DE 10 2013 200 194 A1 discloses a transmission for a motor vehicle with an engine, the transmission comprising a transmission housing and a double clutch assembly having a clutch housing. The clutch housing is connectable to a machine output element, the clutch housing being rotatably mounted in the transmission housing.

In addition, a method is known from DE 10 2013 203 513 A1 for cooling a multi-gear dual-clutch transmission that is connected to an internal combustion engine in a vehicle.

SUMMARY

The object of the present invention is to develop a method and a motor vehicle of the type mentioned above in such a way that a particularly efficient operation can be achieved.

A first aspect of the invention relates to a method for operating a clutch, for example constructed as a friction clutch, of a drivetrain for a motor vehicle, in particular for a motor car such as a passenger car. With the method, at least one micro-slip of the clutch is adjusted in a targeted manner by means of an electronic computing device of the drivetrain, whereby the clutch is operated with the micro-slip during at least one operating phase. As already described above, micro-slip is understood to mean a minor slip of the clutch such that, for example, an input side of the clutch or at least one first component of the clutch disposed on the input side rotates at a first speed and an output side of the clutch or at least one second component of the clutch disposed on the output side of the clutch and drivable by the first component, for example, rotates at a second speed differing slightly from the first speed. In particular, a speed difference between the speeds is, for example, in a range from and including 10 revolutions per minute to and including 100 revolutions per minute, in particular in a range between and including 10 revolutions per minute and including 20 revolutions per minute, such that micro-slip is, for example, in a range from and including 10 revolutions per minute to and including 100 revolutions per minute, in particular in a range from and including 10 revolutions per minute to and including 50 revolutions per minute, and particularly preferably in a range from and including 10 revolutions per minute to and including 20 revolutions per minute.

To be able to achieve, on the one hand, a particularly high level of driving comfort and, on the other hand, a particularly efficient operation with low energy and fuel consumption, it is provided according to the invention that by means of the electronic computing device, also referred to as control unit, an overpressing of the clutch is adjusted in a targeted manner, whereby the clutch is operated slip-free during at least one second operating phase that is different from the at least one operating phase. The at least one operating phase during which the clutch is operated with micro-slip is also referred to as the first operating phase. In addition, the targeted adjusting of the micro-slip or overpressing is understood to mean that the micro-slip or overpressing is desired or deliberately adjusted by means of the electronic computing device, so that the slip or overpressing is not a random event occurring, for example, due to tolerances. For targeted adjusting of the micro-slip or overpressing, for example by means of the electronic computing device, the clutch, in particular at least one actuating element of the clutch, is actuated, for example in that at least one, in particular electrical, actuating signal is transmitted from the electronic computing device to the actuating element and is received by the actuating element.

The invention is based in particular on the following insight: In conventional drivetrains, in particular in conventional transmissions, for example those constructed as double clutch transmissions, a micro-slip of the clutch is usually adjusted while travelling. In a double clutch transmission, for example, this clutch, which is operated with the micro-slip, is the so-called active clutch, which is associated with a sub-transmission of the double clutch transmission and in particular with an engaged gear of the sub-transmission. The drivetrain usually comprises a drive engine, also referred to as a drive machine, which provides the torque to drive the motor vehicle. In particular, the drive engine provides the torques via an output shaft constructed as a crankshaft, for example. The drive engine, which is constructed, for example, as an internal combustion engine or as an electric motor, in particular the output shaft, is coupled, in particular in a rotationally fixed manner, to an input or drive side of the clutch, for example, or to a first component of the clutch disposed on the drive side, in particular in a rotationally fixed manner, so that the torques provided by the drive engine are induced into the clutch on the input or drive side.

The torques provided by the drive engine are transmitted at least in part via the clutch to an output side or driven side of the clutch or to the second component disposed on the output side, wherein the output side or the second component, for example, is coupled, in particular in a rotationally fixed manner, to another shaft, such that the other shaft, which is constructed, for example, as a transmission input shaft of a transmission, is drivable by the drive engine, in particular by the output shaft, via the clutch. In particular, the other shaft or the output side of the clutch is driven by the drive engine via the input side in traction operation or in traction mode, wherein in traction operation or in traction mode the drive engine provides torques for driving the other shaft as described above. The respective torque is also referred to as the drive torque and is, for example, greater than 0 Newton meters in traction mode.

Here, micro-slip means that in traction mode the input side of the clutch or the output shaft rotates a few revolutions faster than the driven side or the other shaft. In overrun operation or in overrun mode, the input side rotates a few revolutions slower than the output side, while the output shaft is driven by the other shaft via the clutch in overrun operation.

Here, for example, the previously mentioned drive torque is less than 0 Newton meters. A speed difference between the input side and the output side is, for example, in a range from and including 10 revolutions per minute to and including 100 revolutions per minute, in particular in a range from and including 10 revolutions per minute to and including 50 revolutions per minute, and preferably in a range from and including 10 revolutions per minute to and including 20 revolutions per minute. This targeted adjusting of micro-slip serves on the one hand to constitute a certain decoupling in the drivetrain, which is also referred to as the power train, in order, for example, to mitigate or dampen rotational irregularities of the drive engine. On the other hand, the targeted adjustment of the micro-slip is used, for example, to precisely adjust the drive torque on the clutch. This means in particular that, for example, a clutch torque of the clutch is adjusted. This clutch torque is the torque that can be transmitted by or via the clutch, for example from the output shaft to the other shaft or vice versa. The afore-mentioned precise adjusting of the drive torque on the clutch means, for example, that the clutch torque is adjusted in such a way that the clutch torque corresponds to the drive torque provided by the drive engine.

In the case of overpressing, the clutch is operated slip-free, i.e. with a slip value of 0 revolutions per minute, so that, for example, the output shaft and the other shaft rotate at the same speed. In the case of overpressing and thus in the case of a slip value of 0 revolutions per minute, the clutch torque associated with the drive torque, also referred to as the engine torque, cannot be adjusted. In other words, in the case of overpressing, the clutch torque cannot be adjusted or cannot be easily adjusted in such a way that the clutch torque corresponds to the drive torque, which is well described, for example, in DE 101 50 597 A1. Precise adjusting of the drive torque on the clutch is, however, advantageous and desirable in order to adjust an advantageous clutch torque, in particular as a sum torque, for example when performing or initiating a shift of the transmission of the drivetrain and thus in the event of an associated torque overlap, in order to be able to perform the shift, which for example may be in the form of an upshift, in a particularly comfortable manner. If, for example, the clutch is closed before and/or during shifting in such a way that overpressing of the clutch and thus a slip value of 0 revolutions per minute occurs, a so-called tensioning occurs during the aforementioned torque overlap, particularly during shifting. This tensioning is perceived by the occupants of the vehicle as deceleration, which impairs driving comfort. This impairment of driving comfort can thus be avoided by operating the clutch with micro-slip.

The specifically adjusted micro-slip, however, has the disadvantage that it generates slip losses. At a drive torque of 200 Newton meters, for example, and an adjusted micro-slip of 15 revolutions per minute, for example, approximately 314 watts of slip power are generated. The slip losses result not only from the fact that power in the clutch is converted into heat by friction, but also from the fact that additional energy is needed to dissipate the induced power and the heat thus generated.

The method according to the invention now allows to avoid both an impairment of driving comfort and excessive slip losses, so that a particularly comfortable and particularly efficient operation, or an operation with a high level of efficiency can be achieved. By adjusting the overpressing in a targeted manner so that the slip between the input and driven sides of the clutch is 0 revolutions per minute, slip losses can be minimized, especially when driving in or on a constant gear. In order to know the exact torque point, i.e. an advantageous clutch torque for achieving a particularly comfortable shift, even, for example, in the case of an initiated shift and, for example, a shift in the form of an upshift or downshift, and to be able to adjust this torque point or clutch torque, for example by means of a torque jump, a ramp or a parabola, the first operating phase, during which the clutch is operated with micro-slip, is performed or adjusted. In the second operating phase, however, slip losses are avoided as the clutch is operated without slip.

In order to achieve a particularly comfortable and efficient operation, an advantageous design of the invention provides that the micro-slip, especially during the first operating phase, is controlled by means of a controller of the electronic computing device. In other words, the micro-slip is adjusted and maintained in a controlled manner by means of the electronic computing device, in particular to at least one setpoint value.

In order to achieve a particularly comfortable and efficient operation, it has also proved to be particularly advantageous that at least one control parameter for controlling the micro-slip is determined in the first operating phase. The control parameter is also referred to as the control component or controller component. The first operating phase is followed by the second operating phase, so that, for example, the clutch is initially operated with micro-slip and then with overpressing. After the second operating phase, a further micro-slip of the clutch is adjusted in a targeted manner by means of the electronic computing device, whereby the clutch is operated with the further micro-slip during a third operating phase following the second operating phase.

It is conceivable that the further micro-slip or its first value may correspond to the first micro-slip or its second value, or the values may differ from each other. It is provided that during the third operating phase, the control parameter determined in the first operating phase and stored, for example, in a memory device of the electronic computing device, is used for controlling the micro-slip.

The first operating phase is thus, for example, a test phase, which is performed between operating phases, for example, during which the clutch is operated with overpressing. In particular, it is conceivable to perform and thus implement one or more test phases between two successive operating phases during which the clutch is operated with overpressing. During or within the respective test phase, at least one control parameter or several control parameters is/are determined by specifically adjusting the respective micro-slip as the target slip, wherein the control parameter or parameters are stored, for example Since, for example, the micro-slip is controlled during the corresponding operating phase or test phase, a micro-slip control is performed, in particular by means of the electronic computing device, in particular during the first operating phase or during the respective test phase. This means that a micro-slip control is performed during the respective test phase, during which the at least one control parameter or the control parameters is/are determined.

If, for example, the second operating phase or the overpressing is exited, the previously determined and, for example, stored control parameter(s) is/are used to operate the clutch, after having been operated with overpressing with micro-slip and to adjust the micro-slip on the basis of the control parameter(s). For this purpose, for example, the determined control parameter itself is used, if necessary, with consideration of or in combination with a correction value, also referred to as an offset value, by which, for example, the previously determined control parameter is corrected.

It has shown to be particularly advantageous if, in the third operating phase following the second operating phase, in which the determined control parameter is used for controlling the micro-slip, a shift of a transmission of the drivetrain is performed. As described above, a particularly comfortable shift can be performed by terminating or exiting the overpressing and using the previously determined control parameter for adjusting or controlling the micro-slip, without any noticeable loss of comfort for the occupants of the motor vehicle.

To keep the energy consumption, in particular the fuel consumption, particularly low, it is provided in a further design of the invention that the clutch is operated with the overpressing during time phases that are outside of shifting phases, during which at least one shift of the transmission is performed. As a result, slip losses can be avoided, which provides for an operation with a particularly high level of efficiency. In addition, comfort losses can be avoided since operation with overpressing does not lead to comfort impairments.

Another embodiment is characterized in that the clutch is operated with overpressing during constant vehicle travel. During such constant travel, the vehicle is driven at an at least substantially constant velocity. As the clutch is operated slip-free, excessive slip losses can be avoided, so that an operation with a particularly high level of efficiency can be achieved.

It has shown to be particularly advantageous if the second operating phase, in particular the test phase, is adjusted when at least one parameter, in particular a predefinable or a defined or definable parameter, changes. This means, for example, that the control parameter can be adapted to the changed or changing parameters, so that, for example, an operation of the clutch with micro-slip or a shift of the transmission following a test phase and an operation with overpressing following the test phase can be performed in a particularly advantageous and convenient manner.

It has shown to be particularly advantageous if the parameter comprises a speed of the drive engine, in particular of the output shaft, and/or the torque provided by the drive engine and/or an acceleration of the motor vehicle. Alternatively or additionally, it is advantageous if the second operating phase is adjusted or ended or exited after a predefinable period of time has lapsed. As a result of this conditional performance of the test phase the control parameter can always be maintained up to date or at an advantageous value, so that on the one hand a comfortable and on the other hand particularly efficient operation can be achieved. In other words, it is preferably provided that the test phases be performed and, in particular, repeated as often as necessary, taking into account changing parameters and boundary conditions such as engine speed, engine torque and/or vehicle acceleration, in particular since the last test phase and/or, for example, depending on a time-related control. Alternatively or additionally, it is conceivable for the overpressing or operation with overpressing to be aborted depending on the mentioned parameter, wherein, for example, the clutch is operated with micro-slip at or after the abort of overpressing.

Overall, the method according to the invention allows to keep time slices in a total operating time of the motor vehicle, which is operated with micro-slip of the clutch in the mentioned time slices, particularly low, so that the energy or fuel consumption of the motor vehicle can be kept particularly low. Also, by means of the test phases and by determining and, for example, storing the controller component, an analog shifting quality can be guaranteed compared to conventional micro-slip control, so that a particularly high level of driving comfort can be achieved. Thus, the method according to the invention is a function for the situational substitution of micro-slip control by the described overpressing in order to achieve an efficiency increase compared to conventional drivetrains or transmissions, in particular in double clutch transmissions, in particular in consideration of physical and driving situational boundary conditions.

A second aspect of the invention relates to a motor vehicle, in particular a motor car such as a passenger car. The motor vehicle has a drivetrain constructed to drive the motor vehicle, the drivetrain comprising at least one clutch and an electronic computing device. The electronic computing device is constructed to adjust at least one micro-slip of the clutch in a targeted manner in order to thereby operate the clutch with the micro-slip during at least one operating phase.

To be able to achieve a particularly efficient operation and particularly high driving comfort, according to the invention the electronic computing device is constructed to adjust an overpressing of the clutch in a targeted manner in order to operate the clutch without slip during at least one second operating phase which is different from the at least one operating phase. Thus, the motor vehicle according to the invention is constructed to perform a method according to the invention. Advantages and advantageous designs of the first aspect of the invention shall be regarded as advantages and advantageous designs of the second aspect of the invention and vice versa.

Further advantages, features and details of the invention will become apparent from the following description of a preferred exemplary embodiment and from the drawing. The features and combinations of features mentioned above in the description and the features and combinations of features mentioned below in the description of the figures and/or shown only in the figures can be used not only in the combination indicated but also in other combinations or alone without departing from the scope of the invention.

DETAILED DESCRIPTION

Figure 1:
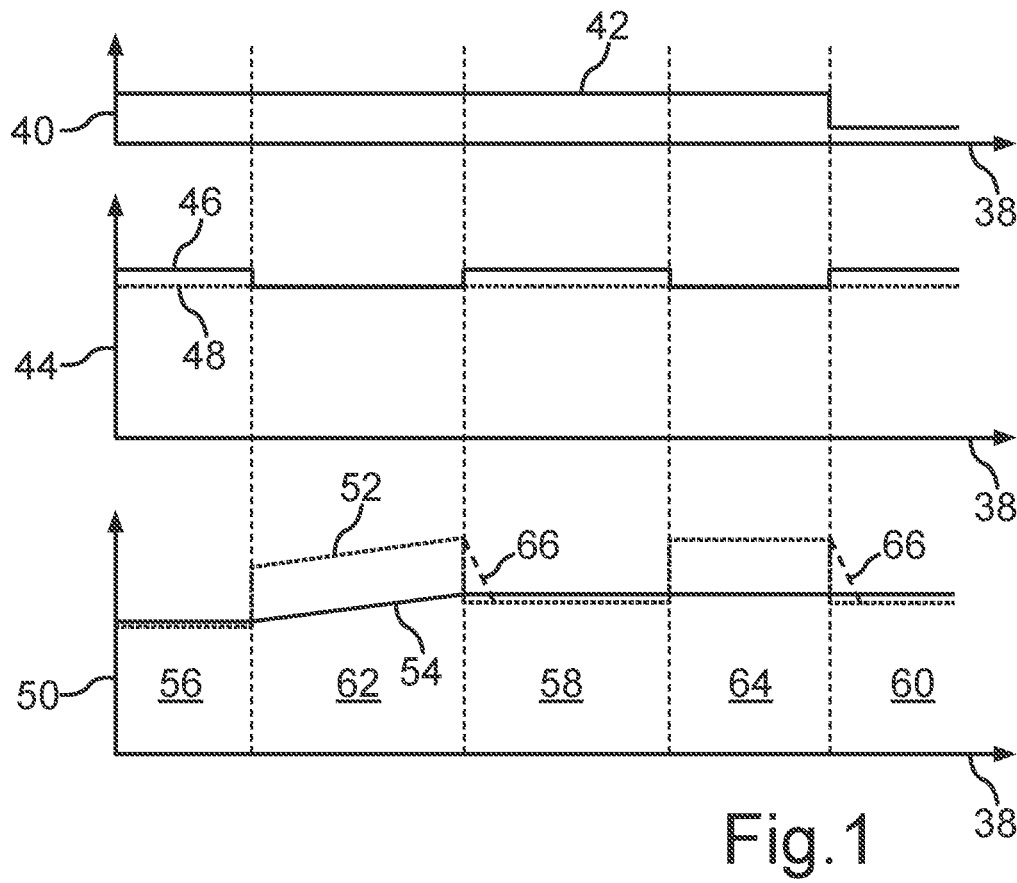
FIG. 1 graphs for illustrating a method according to the invention for operating a clutch of a drivetrain for a motor vehicle in which the clutch is operated temporarily with micro-slip and temporarily with overpressing.

FIG. 1 shows graphs which are used below to explain a method for operating a clutch constructed as a friction clutch 10, schematically shown in FIG. 2, of a drivetrain 12. The drivetrain 12 is a component of a motor vehicle, which, for example, is constructed as a motor car, in particular as a passenger car, and is drivable by means of the drivetrain 12. For this purpose, the drivetrain 12 comprises a drive engine 14 which is constructed, for example, as an internal combustion engine, in particular as a reciprocating piston combustion engine. The drive engine 14 has an output shaft 16 constructed, for example, as a crankshaft through which the drive engine 14 can provide respective torques for driving the motor vehicle. The respective torque provided by the drive engine 14 through the output shaft 16 is also referred to as engine torque or drive torque.

In addition, the drivetrain 10 comprises at least one transmission 18 through which the motor vehicle, in particular wheels 20 of an axle 22 of the drivetrain 12, are drivable by the drive engine 14, in particular by the output shaft 16. The transmission 18 is constructed as a double clutch transmission, for example. The transmission 18 comprises the friction clutch 10, for example, which is also simply referred to as the clutch. In particular, it is conceivable for the transmission 18, in particular if the transmission 18 is constructed as a double clutch transmission, to have two clutches to which respective sub-transmissions are assigned. The clutch 10 is one of the clutches of the double clutch transmission, wherein the previous and following explanations regarding clutch 10 can also be easily applied to the other clutch, if provided, of the double clutch transmission not shown in the figures and vice versa.

Figure 2:
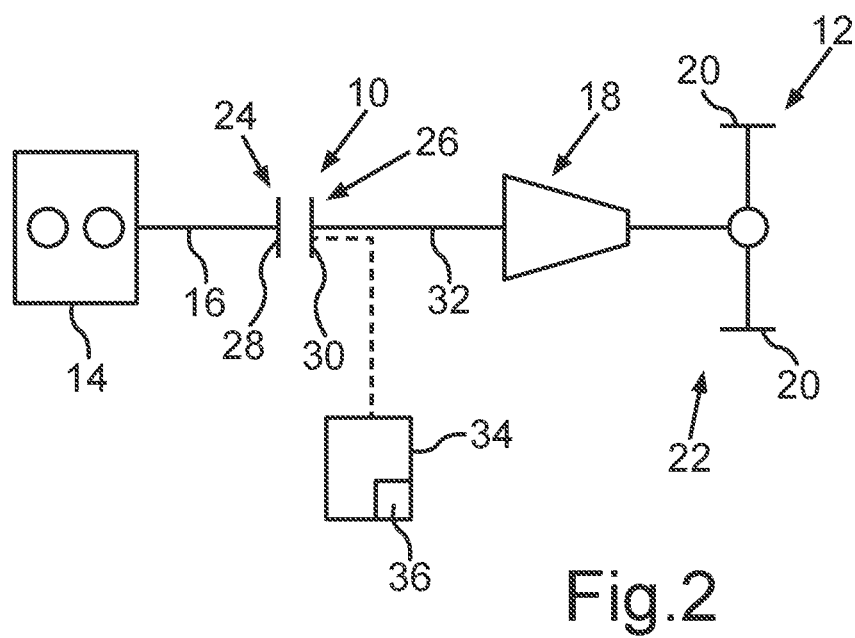
FIG. 2 a schematic representation of the drivetrain.

FIG. 2 shows that the friction clutch 10 (clutch) has an input side 24 and an output side 26, wherein the input side 24 is also referred to as the drive side. The output side 26 is also referred to as the driven side. The output side 26 is drivable from the input side 24, for example, or vice versa. At least one first component 28 of the clutch is disposed on the input side 24, wherein at least one second component 30 of the clutch is disposed on the output side 26. Torques are transmittable between the input side 24 and the output side 26 or between the components 28 and 30 respectively. The input side 24 or the component 28 is coupled to the output shaft 16, for example, in particular in a rotationally fixed manner, so that the input side 24 or the component 28 is drivable by the output shaft 16 or vice versa. Furthermore, the output side 26 or the component 30 is coupled to another shaft 32 of the drivetrain 12, in particular in a rotationally fixed manner, so that, for example, the other shaft 32 is drivable from the output side 26 or by the component 30 or vice versa. The other shaft 32, for example, is a transmission input shaft of the transmission 18, into which the torques provided by the drive engine 14 can be induced via the transmission input shaft. Overall, it can be seen that torques can be transmitted between the output shaft 16 and the other shaft 32 via the friction clutch 10.

The drivetrain 12 further comprises an electronic computing device 34, also referred to as a control unit. The friction clutch 10 is operable by means of the electronic computing device 34. For this purpose, the electronic computing device 34 controls the friction clutch 10, in particular at least one actuator of the friction clutch 10 not shown in the figures, whereby, for example, the friction clutch 10 or the actuator, which is also referred to as the actuating element, is actuated by means of the electronic computing device 34 and is thereby controlled or preferably regulated. For actuating, i.e. for controlling or regulating, the friction clutch 10, in particular the actuating element, the electronic computing device 34, for example, provides at least one signal, in particular an electrical signal, which is also referred to as an actuating signal. For example, the actuating signal is transmitted from the electronic computing device 34 to the friction clutch 10, in particular to the actuating element, and received by the friction clutch 10, in particular by the actuating element. In particular, the electronic computing device 34 has, for example, a controller 36 by means of which the friction clutch 10, in particular the actuating element, can be controlled, i.e. operated in a controlled manner.

In particular, it is provided within the framework of the actuation or operating of the friction clutch 10 that a clutch torque of the friction clutch 10 is adjusted by means of the electronic computing device 34. This clutch torque is, for example, the torque which can be transmitted by or via the friction clutch 10, in particular from the output shaft 16, to the other shaft 32 or vice versa. Time is plotted on the respective abscissa 38 of the respective graph, while gears, for example, in particular target gears, of the transmission 18 are plotted on the ordinate 40. Thus, a progression 42 illustrates a shift of the transmission 18. Within such a shift, a gear change takes place, in which, for example, one gear is disengaged and another gear of the transmission 18 is engaged. In the exemplary embodiment illustrated in the figure, for example, the fifth gear is changed to the sixth gear during the gear change, so that the above shift is an upshift. However, the previous and following explanations can easily be applied to a downshift and vice versa.

A speed is plotted on the ordinate 44, wherein a progression 46 illustrates the speed of the output shaft 16 and thus of the input side 24 or of the component 28. A progression 48 illustrates the speed of the other shaft 32 and thus of the output shaft 26 or of the component 30. A torque is plotted on the ordinate 50, wherein a progression 52 illustrates the mentioned clutch torque. Furthermore, a progression 54 illustrates the engine torque provided by the drive engine 14 via the output shaft 16. The FIG. illustrate a traction mode or traction operation of the drive engine 14. In this traction operation, the drive engine 14 provides torques via the output shaft 16, so that in traction operation the other shaft 32 is driven by the output shaft 16 via the friction clutch 10. The previous and following explanations can also be applied to an overrun operation or overrun mode of the drive engine 14. In overrun operation, for example, the output shaft 16 is driven by the other shaft 32 via the friction clutch 10.

Within the framework of the method it is provided that at least one micro-slip of the friction clutch 10 is adjusted in a targeted manner by means of the electronic computing device, in particular by actuating the actuating element, whereby the friction clutch is operated in a targeted manner with the respectively adjusted micro-slip during operating phases 56, 58 and 60. Micro-slip is understood to mean a minor slip so that, as a result of adjusting of the micro-slip, the input side 24 and the output side 26 or the output shaft 16 and the other shaft 32 rotate at different speeds from one another. In traction operation, for example, the output shaft 16 has a first speed, while the other shaft 32 has a lower second speed compared to the first speed. In overrun operation, however, the first speed is lower than the second speed. A speed difference between the speeds or between the output shaft 16 and the other shaft 32 is preferably a maximum of 100 revolutions per minute, in particular a maximum of 50 revolutions per minute and preferably a maximum of 20 revolutions per minute, wherein the speed difference is greater than 0 and is preferably at least 5 revolutions per minute. In other words, the micro-slip is in a range from and including 5 revolutions per minute to and including 100 revolutions per minute, for example, in particular in a range from and including 5 revolutions per minute to and including 50 revolutions per minute, and preferably in a range from and including 5 revolutions per minute to and including 20 revolutions per minute. The operating phases 56 and 58 are, for example, first operating phases.

Preferably, the micro-slip during the respective operating phases 56, 58, 60 is controlled by means of controller 36, i.e. adjusted and maintained in a controlled manner, in particular at a setpoint value. It is conceivable that the respective micro-slips adjusted during the operating phases 56, 58 and 60 are the same or differ from each other. During the respective operating phases 56, 58, 60, for example, a micro-slip control is thus performed by means of the electronic computing device 34, in particular by actuating the actuating element through the control unit.

In order to achieve a particularly efficient operation and thus an operation with a high level of efficiency of the drivetrain 12, the method further provides that at least one overpressing of the friction clutch 10 is adjusted in a targeted manner by means of the electronic computing device 34, in particular by actuating the actuating element, whereby the friction clutch 10 is operated slip-free in a targeted manner during operating phases 62 and 64, which are different from the operating phases 56, 58 and 60 and are also referred to as second operating phases. Slip-free operation of the friction clutch 10 means that the level of clutch torque of the friction clutch 10 is adjusted such that there is no slip between the input side 24 and the output side 26. As a result of slip-free operation or during slip-free operation, no slip occurs between the input side 24 and the output side 26, so that the output shaft 16 and the other shaft 32 rotate at the same speed. Thus, the operating phases 56, 58 and 60 are operating phases during which the friction clutch 10 is operated with micro-slip. Furthermore, the operating phases 62 and 64 are operating phases during which the friction clutch 10 is operated with overpressing.

Operating phase 60, for example, is a third operating phase which follows the second operating phase 64. As can be seen from FIG. 1, the shift of transmission 18 described above and illustrated by progression 42 is performed in the third operating phase 60. As the friction clutch 10 is operated with micro-slip during the third operating phase 60, the shift can be performed particularly comfortably so that a particularly high driving comfort can be guaranteed for occupants travelling in the interior of the motor vehicle.

In particular, it is provided that the respective first operating phases 56 and 58, respectively, are performed as a test phase. During or in the respective test phase, at least one control parameter for controlling the respective micro-slip is determined so that the controller 36 can use the determined control parameter to control the micro-slip, i.e. to adjust and maintain it in a controlled manner Thus, it is preferably provided that during the third operating phase 60 the control parameter determined in at least one of the test phases, i.e. in the operating phase 62 and/or in the operating phase 64, is used by the controller 36 to control the micro-slip. In other words, during the third operating phase 60, the controller 36 uses the control parameter previously determined in the respective test phase to control the micro-slip during the third operating phase 60 depending on the control parameter previously determined. This enables the friction clutch 10 to be operated in the operating phases 62 and 64 with overpressing and thus with a high level of efficiency. Furthermore, the shift can be performed in a particularly comfortable manner within the third operating phase 60. The method is performed in particular during a constant driving phase, in particular in a fixed gear. The method will be explained again below using a constant driving phase in a fixed gear, taking into account the test phases and phases of overpressing. The background to this is that, in order to keep the friction power particularly low, the overpressing of the friction clutch 10 is adjusted in phases outside shifts and other special conditions, i.e. while driving in a constant gear. As a result, the clutch is no longer operated with slip, whereby losses resulting from the product of adjusted slip and transmitted clutch torque can be, at least largely, eliminated.

Usually, when driving in a constant gear, i.e. outside shifts or special conditions such as coasting or gliding, it is provided that a defined slip is always adjusted in the form of a micro-slip of the friction clutch 10, wherein the slip can vary depending on the driving situation. On the one hand, this serves to decouple the drive engine 14 from the transmission 18 in order to achieve an advantageous noise behavior, also referred to as NVH (NVH-Noise Vibration Harshness) behavior. On the other hand, this serves to set the actual engine torque at the clutch and to avoid operating the clutch in overpressing, which is the basis for a certain shifting comfort when changing the clutch during shifts.

A pre-controlled pI controller, for example, can be used to adjust slip or micro-slip. This means that the engine torque provided or transmitted by the drive engine 14 is fed into the clutch torque in a pre-controlled manner, taking into account moments of inertia, and the downstream pI controller compensates for inaccuracies between the reported engine torque and the adjusted clutch torque. These inaccuracies occur on the engine side, for example, due to gas exchange cycle effects that cannot be mapped in the reported engine torque or can only be mapped with a corresponding degree of accuracy, and on the other hand on the transmission side due to friction coefficient influences, for example, on the clutch that also cannot be mapped in a model with the required degree of accuracy. If there were no inaccuracies between the mapped and the actual engine torque on either the engine or transmission side, the controller would be obsolete and a purely pre-controlled operation would be sufficient.

As it is now intended to operate the clutch over-pressed, i.e. without slip, in phases of driving in a constant gear, i.e. for example in the operating phases 62 and 64, the test phases are implemented to determine the at least one control parameter or to determine several control parameters, the respective control parameter also being referred to as the controller component. Here, the overpressing is, for example, exited or ended abruptly, by means of a ramp 66 or in ramped form, or by means of a parabola or in parabolic form, and thereafter a required target slip is adjusted as micro-slip. If the micro-slip is constantly controlled, the controller components then present are, for example, stored in a memory device of the electronic computing device 34 and the system reverts back to overpressing. This process can be repeated as often as required if, for example, the speed of the drive engine 14 or of the output shaft 16 and/or the applied engine torque has changed by a certain value since the last test phase, in particular if it is to be expected that changed boundary conditions again require different controller components, and/or on the basis of a purely time-related control of the phases or after a certain maximum time of overpressing, the system is to switch to the next test phase.

Conventional systems without overpressing aim, among other things, at achieving the required shifting quality by correctly adjusting the micro-slip and the associated setting of the correct clutch torque. If an excessively high clutch torque were to be adjusted, this would result in tensioning during a torque overlap in the course of, for example, upshifts. If, on the other hand, an excessively low clutch torque were to be adjusted, this would result in engine speed departures in the course of or also outside of shifts.

If, on the other hand, the system were to be run only with overpressing, i.e. without test phases, there would be a danger that the clutch torque would be initialized to an incorrect torque when initializing shifts and exiting the overpressing. Usually, when exiting the overpressing, controlling is based on the engine torque in addition to a correction value, also referred to as an offset value, which is calculated, for example, from the moment of inertia and the speed gradient of the drive engine 14. In addition, the initialization torque can be provided with an additional correction value (offset).

The advantage of the described method, which uses both phases of overpressing and phases of micro-slip, is in particular that as a result of the combination of overpressing and the implemented test phases, both an increase in efficiency and a consistently good shifting quality can be achieved. Thus, the method can combine the main advantages of operating the friction clutch 10 with overpressing with the advantages of operating the friction clutch 10 with micro-slip, so that an operation which is both comfortable and efficient can be achieved.

The invention claimed is:

1. A method for operating a clutch of a drivetrain for a motor vehicle, comprising:
at least one micro-slip of the clutch is adjusted in a targeted manner by an electronic computing device of the drivetrain, whereby the clutch is operated with the micro-slip during at least one operating phase, wherein
an overpressing of the clutch is adjusted in a targeted manner by means of the electronic computing device, whereby the clutch is operated slip-free during at least one second operating phase that is different from the at least one operating phase,
wherein the second operating phase is adjusted or ended after a predefinable period of time has lapsed.

2. The method according to claim 1, wherein the micro-slip is controlled by a controller of the electronic computing device.

3. The method according to claim 2, wherein in the first operating phase at least one control parameter for controlling the micro-slip is determined, wherein the first operating phase is followed by the second operating phase, whereby the clutch is operated with a further micro-slip during a third operating phase following the second operating phase, wherein during the third operating phase the further micro-slip of the clutch is adjusted in a targeted manner by means of the electronic computing device and the control parameter determined in the first operating phase is used for controlling the further micro-slip.

4. The method according to claim 3, wherein in the third operating phase following the second operating phase a shift of a transmission of the drivetrain is performed.

5. The method according to claim 4, wherein the clutch is operated with the overpressing during time phases that are outside of shifting phases, during which the shifting phases at least one shift of a transmission of the drivetrain is performed.

6. The method according to claim 4, wherein the clutch is operated with the overpressing during constant vehicle travel.

7. The method according to claim 4, wherein the overpressing of the clutch is adjusted when at least one parameter changes.

8. The method according to claim 3, wherein the clutch is operated with the overpressing during time phases that are outside of shifting phases, during the shifting phases at least one shift of a transmission of the drivetrain is performed.

9. The method according to claim 3, wherein the clutch is operated with the overpressing during constant vehicle travel.

10. The method according to claim 3, wherein the overpressing of the clutch is adjusted when at least one parameter changes.

11. The method according to claim 2, wherein the clutch is operated with the overpressing during time phases that are outside of shifting phases, during the shifting phases at least one shift of a transmission of the drivetrain is performed.

12. The method according to claim 2, wherein the clutch is operated with the overpressing during constant vehicle travel.

13. The method according to claim 2, wherein the overpressing of the clutch is adjusted when at least one parameter changes.

14. The method according to claim 1, wherein the clutch is operated with the overpressing during time phases that are outside of shifting phases, during the shifting phases at least one shift of a transmission of the drivetrain is performed.

15. The method according to claim 14, wherein the clutch is operated with the overpressing during constant vehicle travel.

16. The method according to claim 1, wherein the clutch is operated with the overpressing during constant vehicle travel.

17. The method according to claim 1, wherein the overpressing of the clutch is adjusted when at least one parameter changes.

18. The method according to claim 17, wherein the parameter comprises a speed of a drive engine of at least one of the drivetrain and a torque provided by the drive engine and/or an acceleration of the motor vehicle.

19. A motor vehicle comprising:
a drivetrain constructed for driving the motor vehicle, the drivetrain having at least one clutch and an electronic computing device, which is constructed to adjust at least one micro-slip of the clutch in a targeted manner in order to thereby operate the clutch with the micro-slip during at least one operating phase, wherein
the electronic computing device is constructed to adjust an overpressing of the clutch in a targeted manner in order to operate the clutch slip-free during at least one second operating phase that is different from the at least one operating phase,
wherein the second operating phase is adjusted or ended after a predefinable period of time has lapsed.

* * * * *